(12) United States Patent
Sandberg

(10) Patent No.: US 7,690,027 B2
(45) Date of Patent: *Mar. 30, 2010

(54) METHOD FOR REGISTERING AND ENABLING PKI FUNCTIONALITIES

(75) Inventor: Leif Sandberg, Saltsjo-bo (SE)

(73) Assignee: Telenor ASA, Fornebu (NO)

(*) Notice: Subject to any disclaimer, the term of this patent is extended or adjusted under 35 U.S.C. 154(b) by 363 days.

This patent is subject to a terminal disclaimer.

(21) Appl. No.: 10/496,919

(22) PCT Filed: Nov. 26, 2002

(86) PCT No.: PCT/NO02/00446

§ 371 (c)(1),
(2), (4) Date: Oct. 13, 2004

(87) PCT Pub. No.: WO03/047161

PCT Pub. Date: Jun. 5, 2003

(65) Prior Publication Data

US 2005/0086496 A1    Apr. 21, 2005

(30) Foreign Application Priority Data

Nov. 28, 2001    (NO) .................................. 20015812

(51) Int. Cl.
G06F 7/04    (2006.01)

(52) U.S. Cl. .................................... 726/9; 726/4; 726/3

(58) Field of Classification Search ................. 380/247; 726/2, 3, 11

See application file for complete search history.

(56) References Cited

U.S. PATENT DOCUMENTS 6,061,791 A    5/2000    Moreau ....................... 713/171

(Continued)

FOREIGN PATENT DOCUMENTS

| EP | 1162781 A2 | 12/2001 |
|---|---|---|
| EP | 1185027 A2 | 3/2002 |
| WO | 02/060210 | 8/2002 |

OTHER PUBLICATIONS

Digitale Signaturer, Sertifikater, Tillit OG TTP-TJenester (PKI Consulting Services, Oslo, Apr. 2001).

Primary Examiner—Pramila Parthasarathy
(74) Attorney, Agent, or Firm—Schneck & Schneck; Thomas Schneck

(57) ABSTRACT

The present invention discloses a method of registering and activation of PKI functionalities in SIM (Subscriber Identity Module) cards by preprinting a number of sealed envelopes each containing an activation code hidden when unopened and a reference number or code visibly printed on the envelope. The reference number or code and the associated activation code of each envelope are stored in a table in a security server being integrated in or connected to the PKI. The user is provided one of the sealed envelopes together with an application form. The user is requested to fill in the reference code or number on the application form together with personal data, and this is transferred to the PKI and the security server. When the registration is approved by the PKI, approval information is transmitted to the user, requesting him to enter the activation code in his terminal. Simultaneously, the activation code associated with the reference code or number in the table and a Smart Card identity corresponding to the Smart Card of the user, are provided to an Activation Module in the PKI. Upon entering of the activation code in the terminal, the activation code together with the Smart Card identity is transmitted from the terminal to the Activation Module. Upon receipt of the activation code and the Smart Card identity, the Activation Module determines if the received activation code and Smart Card identity match those previously provided by the security server, and if so, the Activation Module executes the necessary procedure for enabling the PKI part of the Smart Card.

20 Claims, 1 Drawing Sheet

U.S. PATENT DOCUMENTS

| | | | |
|---|---|---|---|
| 6,370,380 B1 * | 4/2002 | Norefors et al. | 455/436 |
| 6,711,262 B1 * | 3/2004 | Vatanen | 380/277 |
| 6,957,199 B1 * | 10/2005 | Fisher | 705/78 |
| 6,961,858 B2 * | 11/2005 | Fransdonk | 726/29 |
| 6,988,199 B2 * | 1/2006 | Toh et al. | 713/170 |
| 7,020,778 B1 * | 3/2006 | Miettinen et al. | 713/182 |
| 7,315,823 B2 * | 1/2008 | Brondrup | 705/1 |
| 2004/0043758 A1 * | 3/2004 | Sorvari et al. | 455/414.1 |
| 2006/0020783 A1 * | 1/2006 | Fisher | 713/156 |

* cited by examiner

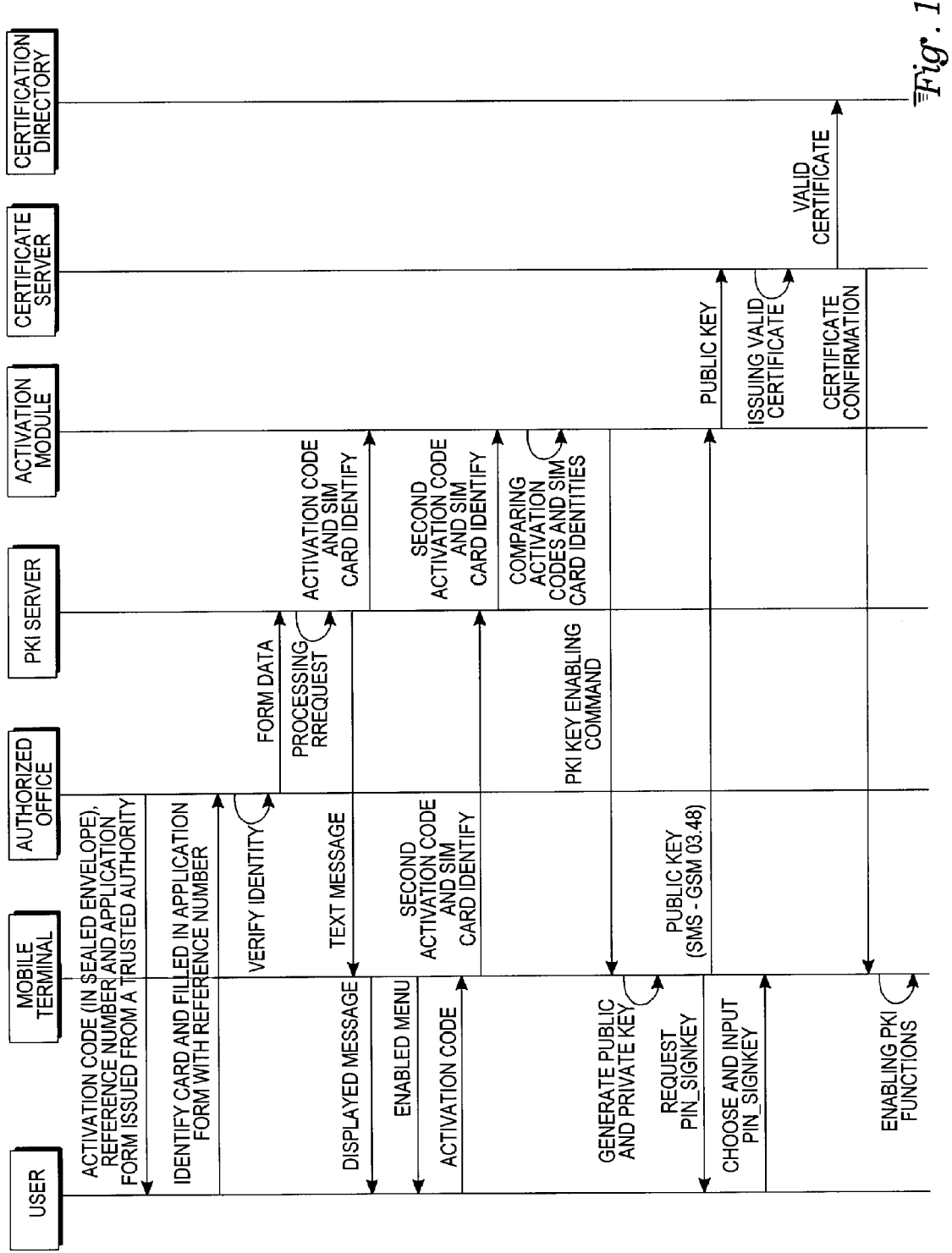

METHOD FOR REGISTERING AND ENABLING PKI FUNCTIONALITIES

FIELD OF THE INVENTION

The present invention is related to PKI (Public Key Infrastructure), structure), particularly to registering and activation of PKI (Public Key Infrastructure) functionalities in SIM (Subscriber Identity Module) cards.

BACKGROUND OF THE INVENTION

To realize the full potential of communication networks, there has to exist a standardized system so that the users can engage in electronic transactions with the same degree of trust as associated with paper-based transactions.

For this reason, PKI has been developed as the primary platform for global commerce and communications. PKI insures that sensitive electronic communications are private and protected from tampering. PKI is used for digital signatures, authentication and encryption.

PKI is based on the use of cryptography, which means scrambling of information by a mathematical formula and a virtual key, so that only an authorized party using a related key can decode it. A PKI uses pairs of cryptographic keys provided by a trusted third party known as a Certification Authority (CA). Central to the workings of a PKI, a CA issues digital certificates that identify the holder's identity. A CA maintains accessible directories of valid certificates, and a list of certificates it has revoked.

Traditionally, PKI functionalities have been used by data terminals with the certificate and keys stored in an external Smart Card. However, as cellular phones merge to data terminals, there will be a need for PKI functions also in the phones. The certificate and keys will then normally be stored in the subscriber card, e.g. in the SIM (Subscriber Identity Module) card as for GSM phones.

For the PKI system to be trusted, there has to exist a secure routine when registering new users by issuing digital certificates. One has to be 100% sure that the one requesting digital certificates is who he or she claims to be. This is normally done in that the user in person shows up at an office, e.g. at a post office, fills in a form and identifies himself by a trusted identification like a passport. When the counter clerk at the post office has verified the identification information, the data form is transmitted electronically to a CA. The CA controls and whitewashes the data and issues a PKI card, either in the form of a SIM card or a Smart Card, together with an activation code. The PKI card and the activation code are now sent by registered mail to the user. Again, the user personally has to appear in the post office and identify himself by, e.g., his passport, for being allowed to receive the mail.

This two-time appearance at an office has turned out to be a problem for the spreading of PKI, simply because people seem to have a resistance against making use of new technology with high entrance thresholds meaning that great initial efforts have to be made. Also, the process is naturally time consuming, and at least one week will lapse from the certificate is ordered to the user has got access to PKI functions.

From the issuer of digital certificates point of view, the costs of the issuing process are relatively high, especially because of the execution and sending of the registered mail.

Thus, there is a need for simplifying the issuing process for the benefit for both the issuer and the user.

SUMMARY OF THE INVENTION

It is an object of the present invention to provide a method that eliminates the drawbacks described above. The features defined in the claims enclosed characterize this method.

More specifically, the present invention provides a method of a Public Key Infrastructure (PKI) for registering a user of the PKI and enabling a PKI part of a Smart Card of the user by preprinting a number of sealed envelopes each containing an activation code hidden when unopened and a reference number or code visibly printed on the envelope. The reference number or code and the associated activation code of each envelope are stored in a table in a security server being integrated in or connected to the PKI. The user is provided one of the sealed envelopes together with an application form. The user is requested to fill in the reference code or number on the application form together with personal data, and this is transferred to the PKI and the security server.

When the registration is approved by the PKI, approval information is transmitted to the user, requesting him to enter the activation code in his terminal. Simultaneously, the activation code associated with the reference code or number in the table and a Smart Card identity corresponding to the Smart Card of the user, are provided to an Activation Module in the PKI. Upon entering of the activation code in the terminal, the activation code together with the Smart Card identity is transmitted from the terminal to the Activation Module. Upon receipt of the activation code and the Smart Card identity, the Activation Module determines if the received activation code and Smart Card identity match those previously provided by the security server, and if so, the Activation Module executes the necessary procedure for enabling the PKI part of the Smart Card.

More specifically, the present invention provides a method for reliable and secure enabling of a Public Key Infrastructure —PKI—part of a Smart Card of a first mobile terminal, said mobile terminal connected to a mobile communication network providing access to a PKI server, connected to the same network is a control authority—CA. And the method is further defined by the following steps:—A first request for a PKI part of a Smart Card for a user is received electronically at the PKI server. Said PKI server is processing said request. The PKI server is generating a text message, where the textual content of the text message is a response to the processing of the first request, the text message is sent to the first mobile terminal. The first mobile terminal is responding to the received text message by sending a second activation code and a SIM card identity associated with the first mobile terminal as a text message to the PKI server. The PKI server compares said second activation code with a previously received first reference activation code, if the two activation codes matches the PKI server will transmit a message to the first mobile terminal indicating the match of the password, said message is a PKI key enabling command.

BRIEF DESCRIPTION OF THE DRAWING

FIG. 1 is a block diagram of method steps of PKI processes.

DETAILED DESCRIPTION OF AN EXAMPLE EMBODIMENT

FIG. 1 illustrates components of the example embodiment.

The present invention is described by an example where a user is about to order a SIM card with PKI functionality for a GSM phone. The present application is related to U.S. Patent No. 7,024,226 B2, owned by the assignee of the present invention.

As before, the user has to show up in person in authorized offices, like a post office, a bank or at the telephone operator, to which the user is subscribed.

At the authorized office, the user will receive a preprinted sealed envelope together with an application form he is asked to fill in. A reference number printed on a noticeable place thereon identifies the envelope. The form and the sealed envelope that the user receive at the office is uniquely associated with each other in that the mentioned reference number also is printed on the form, or is one of the data the user is asked to fill in.

After filling the form, an officer will check if the given personal information, herein referred to as personalia matches those on an identity card the user has to produce and that the reference number corresponds to the one printed on the envelope. If the personalia and the number correspond to the identity card, the form is forwarded to further execution, and the user will be asked to keep the envelope sealed until he has received his new SIM card.

The sealed envelope contains an activation code that is invisible when the envelope is unopened. Data concerning all the preprinted envelopes are stored, e.g., in a table within a security server connected to or integrated in the PKI. For each envelope, at least the corresponding reference number, activation code and a status are stored so that once the security server knows the reference number or code of an application form, it also knows the activation code that is given to the user in the envelope together with the application form, and in which stage of execution the application presently is. The status may be one of the following: unused, under consideration, approved, but not activated, activated, not approved. Initially, the status is set to "unused".

Turning to the user example, the form data is read, preferably electronically, and transferred to the security server. Simultaneously, the status of the envelope stored in the table is changed from "unused" to "under consideration". The form data, which in this example should be considered as an application for a PKI SIM card, is executed by a PKI server under control of a CA in a way according to the state of the art, which should be known to a person skilled in the art. Additionally, the status of the envelope will be changed in the security server according to the result of the execution. If the application is refused, the corresponding status is changed to "not approved". In contrast, if the application is approved, the corresponding status is naturally changed to "approved".

The result of the execution of the application will then be sent to the user in a message via a communication network, preferably carried by SMS or similar, and alternatively by e-mail or mail. A new SIM card may be sent to the user, but it is not necessary to use registered mail because the user will be able to prove his identity by using the activation code hidden in the envelope. Alternatively, if the user already has a SIM card with PKI functionality installed, but till now not accessible, no new SIM card will be necessary to issue. Simultaneously, the security server will provide an Activation Module with the activation code associated with the reference number or code together with necessary identity information regarding the corresponding SIM card.

A message representing a positive result will, e.g., read as follows: "Your application has been approved, please open the sealed envelope and use the activation code inside on your SIM card".

However, before the user may enter the activation code, a "SIM PKI menu" must be enabled. When the "SIM PKI menu" is enabled, the user enters the activation code in his handset to enroll to the service. The activation code is sent by SMS to the PKI together with the SIM card identity. The user may have 3 attempts to enter this code correctly.

The Activation Module fetches the activation code and the SIM card identity and verifies if it matches the activation code and the SIM card identity that already have been provided from the security server. The Activation Module then transmits a "Generate PKI keys enabling command" back to the SIM, and the key generation application in the SIM will generate a key pair comprising one private key and one verification public key.

The verification public key (VPuK) is transmitted by SMS to the Activation Module, and the SMS is preferably encrypted according to GSM 03.48 for protection of sensitive information.

The user is then requested to choose a PIN_SIGNKEY, which is a personal self-chosen signing PIN used for, e.g., transaction signing and authentication.

In the case of successful verification, the Activation Module connects to the CA to issue a valid certificate with the public key associated with the user. This certificate is at the same time sent to a certification directory.

A confirmation of successful certification is sent back to the user and the PKI menu will then be disabled in the SIM. Consequently, the PKI functions in the SIM card are enabled.

The present invention provides a method for registering and activation of PKI (Public Key Infrastructure) functionalities making it unnecessary for a user to show up in person at an authorized office more than once. Sending of items and data associated with the PKI functionalities after the first identity confirmation will not be necessary, as the user will be in possession of the activation code before his identity is assigned to the activation code, inter alia, in the RA. This guarantees that the right person is in possession of the right activation code already at the time of the first personal appearance.

From a user's point of view, the present invention allows for less effort in providing PKI functionalities. From an issuer's point of view, the present invention will most likely increase the number of PKI users. In addition, the costs per registration will decrease as the execution time will decrease and the need of registered mail will be eliminated.

The invention claimed is:

1. A method for reliable and secure enabling of a Public Key Infrastructure ("PKI") part of a Smart Card of a first mobile terminal, said mobile terminal connected to a mobile communication network providing access to a PKI server, the method comprising:
   a) generating matching first and second activation codes associated with a deactivated PKI part of a Smart Card, the first activation code being stored at a PKI server;
   b) receiving electronically a first request for activating to a PKI key-handling state the deactivated PKI part of the Smart Card for a user at the PKI server,
   c) processing said request at said PKI server,
   d) generating a text message at the PKI server, where the textual content of the text message is a response to the processing of the first request, and sending the text message to the first mobile terminal,
   e) responding to the received text message at the first mobile terminal by sending a second activation code and a SIM card identity associated with the first mobile terminal as a text message to the PKI server,
   f) comparing said sent second activation code with the previously store first activation code at the PKI server, and, if the two activation codes match, transmitting from the PKI server a message to the first mobile terminal indicating the match, wherein said message is a command activating the PKI part of the Smart Card to the PKI key-handling state,
   g) generating a private key and a verification public key ("VpuK") as a key pair, using the activated PKI part of the Smart card.

2. A method according to claim 1, further comprising:
f) transmitting the VpuK to the PKI server,
g) requesting a user of the first mobile terminal to input a self chosen PIN code on the first mobile terminal,
h) connecting the PKI server to a certification authority ("CA"), the CA responding by issuing of a valid certificate with a public key associated with the user of the first mobile terminal,
i) receiving a confirmation of successful certification at the first mobile terminal, wherein the PKI functions in the SIM card associated with said first terminal are enabled.

3. A method according to claim 1, further comprising a first server further communicating with a first activation module, wherein the first server is one of the following:
a) an integral part of the PKI server; or
b) directly connected to the PKI server.

4. A method according to claim 3, further comprising the first server updating a first table with status data associated with said first request in response to receiving said request.

5. A method according to claim 4, wherein receiving electronically a first request and processing said request further comprises:
said first server processing said request and transmitting the request to the PKI server, wherein the PKI server processes the request,
transmitting the result of the processing at the PKI server to the first server which updates the first table with the present request status,
generating a text message using the PKI server, where the textual content of the text message is a response to the processing of the first request, wherein when the text message is sent to the first mobile terminal, simultaneously or substantially simultaneously the first server transmits the first activation code to the first activation module, said first activation code associated with the requested part of the Smart Card.

6. A method according to claim 5, wherein responding to the text message further comprises:
enabling a first menu associated with PKI handling on the first mobile terminal,
the user entering the second activation code, the first mobile terminal is sending the second activation code and a SIM card identity associated with the first mobile terminal as a text message to the PKI server.

7. A method according to claim 6, wherein comparing said activation code further comprises:
the activation module part of the PKI server is fetching the second activation code and the associated SIM card identity from the PKI server and comparing said second activation code with the previously received first activation code, wherein if the two activation codes match, the activation module transmits a message to the first mobile terminal indicating the match wherein said message is a PKI key enabling command.

8. A method according to claim 2, wherein transmitting the VpuK to the PKI server further comprises:
transmitting the VpuK to an activation module part of the PKI server.

9. A method according to claim 1, wherein said communication network is a GSM or 3G network, said terminal is a GSM or 3G mobile telephone, and said Smart Card is a SIM card.

10. A method according to claim 9, characterized in that said Smart Card identity is an MSISDN and ICCID.

11. A method according to claim 1, wherein said PKI functions are stored in said Smart Card, but hidden for the user until activating.

12. A method according to claim 1, wherein the approval information is transmitted via SMS, e-mail or mail.

13. A method according to claim 5, wherein the status is initially set to "unused" and changed to "under consideration" during step b) in claim 1, "approved but not activated" in the case of approval during step e) in claim 1, and "activated" in the case of a match in step i) in claim 2.

14. The method of claim 2 wherein the VpuK is transmitted as an encrypted text message.

15. A method for reliable and secure enabling of a Public Key Infrastructure ("PKI") part of a Smart Card of a first mobile terminal, said mobile terminal connected to a mobile communication network providing access to a PKI server, the method comprising:
a) storing in a PKI server a first activation code associated with a deactivated PKI part of a Smart card before a first request for activating to a PKI key-handling state the deactivated PKI part of the Smart Card is begun, a second activation code being available at an authorized office and matching the first activation code;
b) sending to the PKI server the first request for activating the deactivated PKI part of the Smart Card after obtaining the second activation code from the authorized office;
c) sending a message from the PKI server to the first mobile terminal upon an approval of the first request;
d) sending from the first mobile terminal to the PKI server the second activation code and a Smart Card identity associated with the first mobile terminal in response to the message;
e) comparing the first activation code and the second activation code after the second activation code is received at the PKI server; and
f) sending from the PKI server to the first mobile terminal a command to activate to the PKI key-handling state the PKI part of the Smart Card when a match is determined upon comparing the first activation code and the second activation code;
g) generating, using the activated PKI Part of the Smart card, a key pair having a private key and a verification public key ("VpuK").

16. The method of claim 15 further comprising:
g) sending the VpuK from the first mobile terminal to the PKI server in response to receiving a PKI keys enabling command as the command activating the PKI part of the Smart Card;
h) sending a request from the PKI server to the first mobile terminal for a self chosen PIN code in response to receiving the verification public key;
i) sending a self chosen PIN code from the first mobile terminal to the PKI server in response to receiving a request for a self chosen PIN code;
j) issuing a valid certificate from a certification authority ("CA"), with a public key associated with a user of the first mobile terminal, in response to receiving the self chosen PIN code; and
k) completing enablement of the PKI part of the Smart Card upon receipt of a confirmation of certification.

17. The method of claim 15 wherein the Smart Card is a SIM card.

18. A method for requesting and activating PKI functionality comprising:
storing in a PKI server a first activation code from an authorized office and a reference code, prior to transferring to the PKI server an activation request for activating to a PKI key-handling state a deactivated PKI part of a Smart Card from a user, the first activation code and the reference code being associated with the deactivated PKI part of the Smart card;

providing to the user via the authorized office the reference code and a second activation code matching the first activation code;

transferring to the PKI server from the user the activation request and the reference code;

sending an approval message from the PKI server to a first mobile terminal in response to receiving the activation request at the PKI server;

providing to an activation module from the PKI server the reference code, the first activation code as stored in the PKI server and a Smart Card identity;

sending the Smart Card identity and the second activation code from the user to the PKI server in response to receiving the approval message at the first mobile terminal;

comparing at the activation module the first activation code provided by the PKI server with the second activation code received from the PKI server as sent by the user;

enabling activation, to the PKI key-handling state, of the PKI part of the Smart Card identified by the Smart Card identity when the comparing shows the first activation code matches the second activation code; and generating, using the activated PKI Part of the smart card, a key pair having a private key and a verification public key ("VpuK"), in response to said activation.

19. The method of claim 18 further comprising:

sending a command to the Smart Card to enable PKI keys when enabling the PKI part of the Smart Card;

sending the VpuK to the activation module when the PKI keys are enabled;

sending a self chosen PIN from the first mobile terminal after the verification public key is sent;

issuing a certificate from a certification authority ("CA") after the self chosen PIN is sent; and sending a confirmation of successful certification to the first mobile terminal after the certificate is issued.

20. The method of claim 18 wherein the Smart Card is a SIM card.

* * * * *